US009666371B2

United States Patent
Morita et al.

(10) Patent No.: US 9,666,371 B2
(45) Date of Patent: May 30, 2017

(54) MULTILAYER CERAMIC CAPACITOR

(71) Applicant: TAIYO YUDEN CO., LTD., Taito-ku, Tokyo (JP)

(72) Inventors: Koichiro Morita, Takasaki (JP); Chie Kawamura, Takasaki (JP); Minoru Ryu, Takasaki (JP); Katsuya Taniguchi, Takasaki (JP); Kazumichi Hiroi, Takasaki (JP); Yoshiki Iwazaki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/002,324

(22) Filed: Jan. 20, 2016

(65) Prior Publication Data

US 2016/0217924 A1 Jul. 28, 2016

(30) Foreign Application Priority Data

Jan. 28, 2015 (JP) .................................. 2015-014179

(51) Int. Cl.
*H01G 4/12* (2006.01)
*C04B 35/468* (2006.01)
(Continued)

(52) U.S. Cl.
CPC ....... *H01G 4/1227* (2013.01); *C04B 35/4682* (2013.01); *C04B 35/62685* (2013.01); *H01G 4/30* (2013.01); *C04B 2235/3206* (2013.01); *C04B 2235/3215* (2013.01); *C04B 2235/3224* (2013.01); *C04B 2235/3232* (2013.01); *C04B 2235/3251* (2013.01); *C04B 2235/3256* (2013.01); *C04B 2235/3258* (2013.01); *C04B 2235/3262* (2013.01); *C04B 2235/3418* (2013.01); *C04B 2235/5409* (2013.01);
(Continued)

(58) Field of Classification Search
CPC .......................... C04B 35/4682; H01G 4/1227
See application file for complete search history.

(56) References Cited

U.S. PATENT DOCUMENTS

| | | | | |
|---|---|---|---|---|
| 6,437,969 B2* | 8/2002 | Mizuno | ................ | C01G 23/006 361/306.1 |
| 6,656,865 B2* | 12/2003 | Saito | .................... | H01G 4/1227 361/321.2 |
| 7,706,125 B2* | 4/2010 | Fukuda | ................ | H01G 4/1227 29/25.42 |

FOREIGN PATENT DOCUMENTS

| | | |
|---|---|---|
| JP | H10330160 A | 12/1998 |
| JP | 2001230150 A | 8/2001 |
| JP | 2011256091 A | 12/2011 |

* cited by examiner

*Primary Examiner* — Karl Group
(74) *Attorney, Agent, or Firm* — Law Office of Katsuhiro Arai

(57) ABSTRACT

A multilayer ceramic capacitor has a laminate comprising dielectric layers stacked alternately with internal electrode layers of different polarities, wherein: the dielectric layers contain ceramic grains whose primary component is $BaTiO_3$; the ceramic grains contain at least one type of donor element (D) selected from the group that includes Nb, Mo, Ta, and W, and at least one type of acceptor element (A) selected from the group that includes Mg and Mn; and the ratio of the concentration of the donor element (D) and that of the acceptor element (A) (D/A) is greater than 1 at the center parts of the ceramic grains, while the D/A ratio is less than 1 at the outer edge parts of the ceramic grains (if A=0, then D/A=∞ and D=A=0 never occurs).

16 Claims, 2 Drawing Sheets

(51) Int. Cl.
*H01G 4/30* (2006.01)
*C04B 35/626* (2006.01)
(52) U.S. Cl.
CPC .... *C04B 2235/663* (2013.01); *C04B 2235/75* (2013.01); *C04B 2235/781* (2013.01); *C04B 2235/786* (2013.01); *C04B 2235/85* (2013.01)

MULTILAYER CERAMIC CAPACITOR

BACKGROUND

Field of the Invention

The present invention relates to a multilayer ceramic capacitor whose ratio of the concentration of the specified donor element and that of the specified acceptor element in the ceramic grain constituting the dielectric layer varies depending on the site of the ceramic grain.

Description of the Related Art

In recent years, there is a high demand for smaller electronic components to support higher density electronic circuits used in mobile phones, tablet terminals, and other digital electronic devices, and accordingly, multilayer ceramic capacitors (MLCC) that constitute these circuits are rapidly becoming smaller in size and larger in capacitance.

The capacitance of a multilayer ceramic capacitor is proportional to the dielectric constant of the constituent material of the dielectric layers constituting the capacitor and also to the number of the dielectric layers, and inversely proportional to the thickness of one dielectric layer. For this reason, answering the demand for smaller multilayer ceramic capacitors requires that the dielectric constant of their material be increased, while the thickness of the dielectric layer be reduced to increase the number of layers.

However, reducing the thickness of the dielectric layer increases the voltage applied per unit thickness, which in turn shortens the service life of the dielectric layer and consequently reduces the reliability of the multilayer ceramic capacitor. Accordingly, dielectric compositions to which such donor elements as Mo and W are added to improve the service life, are proposed.

In addition, the distribution of abundance ratios of the aforementioned donor elements and other additive elements in the ceramic grains constituting the dielectric layer affects the performance of the multilayer ceramic capacitor. About this point, Patent Literature 1, for example, describes a dielectric porcelain offering improved dielectric breakdown voltage, wherein the dielectric porcelain is such that additive elements such as Mn, V, Cr, Co, Ni, Fe, Nb, Mo, Ta, and W (these components are believed to improve reduction resistance) are distributed roughly uniformly over the entire range from the grain boundary to the center of the crystal grain.

Patent Literature 2 proposes a multilayer ceramic capacitor whose service life will not be shortened due to dielectric breakdown, etc., even if the number of dielectric layers is increased or the thickness of the dielectric layer is reduced, and which also permits size reduction and capacitance increase, wherein the constitution of the multilayer ceramic capacitor is such that its ceramic grain is constituted by a crystalline core and a shell that encloses the core, that additive elements such as Mn, V, Cr, Mo, Fe, Ni, Cu, and Co are added to the core, and that the concentration of these additive elements increases from the center of the core toward the shell.

Also, Patent Literature 3 describes a barium titanate ceramic grain as a dielectric ceramic that will give a multilayer ceramic capacitor offering good capacitance-temperature characteristics and excellent service life characteristics, wherein such grain is characterized in that it has a core and a shell and contains rare earth elements R and M (here, M represents at least one type selected from the group that consists of Mg, Mn, Ni, Co, Fe, Cr, Cu, Al, Mo, W, and V) as secondary constituents, where the total concentration of R and M slopes from the grain boundary to the core and becomes minimum in a part and maximum in other part.

BACKGROUND ART LITERATURES

[Patent Literature 1] Japanese Patent Laid-open No. Hei 10-330160

[Patent Literature 2] Japanese Patent Laid-open No. 2001-230150

[Patent Literature 3] Japanese Patent Laid-open No. 2011-256091

SUMMARY

However, the inventions described in these literatures present room for improvement of life characteristics when the thickness of the dielectric layer is 0.8 µm or less. For example, the donor element Mo is believed to improve life characteristics by suppressing oxygen defect, but in a constitution like the one in Patent Literature 2 where the Mo concentration increases from the center of the core toward the shell of the ceramic grain, the regions of high Mo concentrations are limited in volume and consequently sufficient life characteristics improvement effect cannot be achieved.

On the other hand, the inventors of the present invention studied and found that, if Mo or other donor element is contained sufficiently at the center and other sites of the ceramic grain, the electrons supplied by the donor element can contribute to electrical conduction, which improves the life characteristics of the multilayer ceramic capacitor, but also presents a problem of increase in the leak current of the capacitor.

Accordingly, an object of the present invention is to provide a multilayer ceramic capacitor offering excellent life characteristics while suppressing leak current, even when the thickness of the dielectric layer is 0.8 µm or less.

Any discussion of problems and solutions involved in the related art has been included in this disclosure solely for the purposes of providing a context for the present invention, and should not be taken as an admission that any or all of the discussion were known at the time the invention was made.

After studying in earnest to achieve the aforementioned object, the inventors of the present invention found that Nb, Mo, Ta, and W are particularly effective as donor elements. As for the problem of leak current, the inventors came up with the idea of adding Mg, Mn, or other acceptor element to trap the electrons supplied by the donor element, in order to improve insulation property and thereby suppress leak current.

However, adding an acceptor element to completely neutralize the electrical charges of the ceramic grain system also eliminates the life characteristics improvement effect based on the suppression of oxygen defect generation achieved by adding a donor element.

Accordingly, the present invention creates a difference in the ratio of the concentration of the donor element and that of the acceptor element at the center part and outer edge part of the ceramic grain constituting the dielectric layer of the multilayer ceramic capacitor, wherein the donor element is made richer at the center part in order to ensure sufficient volume of regions of high donor element concentrations and thereby improve life characteristics, while at the same time the acceptor element is made richer at the outer edge part in order to lower the electron concentration at the outer edge part and thereby suppress leak current.

In other words, the present invention represents a multilayer ceramic capacitor having a laminate comprising dielectric layers stacked alternately with internal electrode layers of different polarities, wherein: the dielectric layers contain ceramic grains whose primary component is $BaTiO_3$; the ceramic grains contain at least one type of donor element (D) selected from the group that includes Nb, Mo, Ta, and W, and at least one type of acceptor element (A) selected from the group that includes Mg and Mn; and the ratio of the concentration of the donor element (D) and that of the acceptor element (A) (D/A) is greater than 1 at the center parts of the ceramic grains, while the D/A ratio is less than 1 at the outer edge parts of the ceramic grains (if A=0, then D/A=∞ and D=A=0 never occurs).

The concentration of the donor element (D) in the dielectric layers is preferably 0.05 to 0.3 mol relative to 100 mol of $BaTiO_3$, from the viewpoint of life characteristics of the multilayer ceramic capacitor and also from the viewpoint of suppressing its leak current.

The concentration of the acceptor element (A) in the dielectric layers is preferably greater than 0.3 mol but less than 2.0 mol relative to 100 mol of $BaTiO_3$, from the viewpoint of life characteristics of the multilayer ceramic capacitor and also from the viewpoint of suppressing its leak current.

The type of the donor element (D) present at the center part of the ceramic grain is preferably the same as that present at the outer edge part, from the viewpoint of facilitating the control of life characteristics.

The average grain size of the ceramic grains is preferably 80 to 800 nm, from the viewpoint of reducing the thickness of the dielectric layer.

According to the present invention, a multilayer ceramic capacitor is provided that offers excellent life characteristics, while suppressing leak current, even when the thickness of the dielectric layer is 0.8 μm or less.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1:
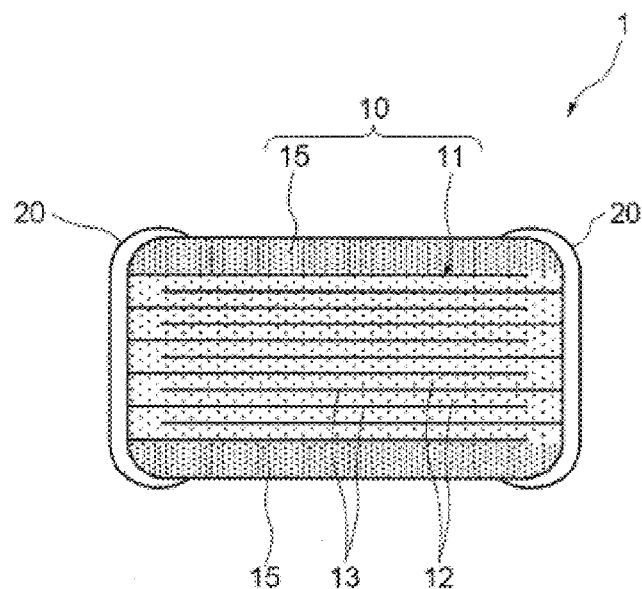
FIG. 1 is a schematic longitudinal section view of a multilayer ceramic capacitor in an embodiment of the present invention.

1 Multilayer ceramic capacitor
10 Ceramic sintered compact
11 Laminate
12 Dielectric layer
13 Internal electrode layer
15 Cover layer
20 External electrode

DETAILED DESCRIPTION OF EMBODIMENTS

A multilayer ceramic capacitor in an embodiment of the present invention is explained below. FIG. 1 is a schematic longitudinal section view of a multilayer ceramic capacitor 1 according to the present invention.

[Multilayer Ceramic Capacitor]

The multilayer ceramic capacitor 1 roughly comprises a ceramic sintered compact 10 having standard-defined chip dimensions and shape (such as rectangular solid of 1.0×0.5× 0.5 mm) and a pair of external electrodes 20 formed on both sides of the ceramic sintered compact 10. The ceramic sintered compact 10 is primarily constituted by a grain crystal of $BaTiO_3$, and has a laminate 11 that internally contains dielectric layers 12 laminated alternately with internal electrode layers 13, as well as cover layers 15 formed as outermost layers in the laminating direction.

The laminate 11 has a high-density multi-layer structure comprising a total of one hundred to several hundred layers, having dielectric layers 12 with a thickness of 0.8 μm or less sandwiched in between two internal electrode layers 13, according to the electrostatic capacitance, required withstand voltage, and other specifications.

The cover layers 15 formed in the outermost layer parts of the laminate 11 protect the dielectric layers 12 and internal electrode layers 13 from humidity, contaminants, and other pollutants coming from the outside, thereby preventing them from deteriorating over time.

In addition, the edges of the internal electrode layers 13 are led out alternately to the pair of external electrodes 20 of different polarities present on both ends of the dielectric layer 12 in the length direction.

And, the dielectric layer 12 of the multilayer ceramic capacitor 1 according to the present invention contains ceramic grains whose primary component is $BaTiO_3$, and the ratio of the concentration of the donor element (D) and that of the acceptor element (A) in the ceramic grains has a specified distribution in the area inside the ceramic grain. $BaTiO_3$ is constituted substantially by, consists essentially of, or consists of Ba, Ti, and O elements. The concentration of an element is a concentration [mol %] of the element relative to $BaTiO_3$ determined in an area observed in a cross section as can be understood in the explanation below, for example.

The donor element (D) is specifically Nb, Mo, Ta, and/or W. In some embodiments, no element functioning as a donor other than the above is contained. Also, the acceptor element (A) is specifically Mg and/or Mn. In some embodiments, no element functioning as an acceptor other than the above is contained. Also, the specified distribution means that the ratio of the concentration of the donor element (D) and that of the acceptor element (A) (D/A) varies depending on the site of the ceramic grain, such as that the D/A ratio is greater than 1 at the center part of the ceramic grain, while the D/A ratio is less than 1 at the outer edge part of the ceramic grain. If A=0, D/A=∞ and D=A=0 never occurs.

This way, the ratio of the concentration of the donor element (D) and that of the acceptor element (A) becomes donor-element (D) rich at the center part of the ceramic grain and acceptor-element (A) rich at the outer edge part, and because of this, first of all, favorable life characteristics improvement effect is achieved by the donor element (D) at the center part. Then, at the outer edge part of the ceramic grain, the acceptor element (A) traps the electrons supplied by the donor element (D) and the electron concentration at the outer edge part drops as a result, and this in turn suppresses leak current.

As described above, the present invention adds the specified distribution to the ratio of the concentration of the donor element (D) and that of the acceptor element (A) inside the ceramic grain, thereby allowing the respective elements to primarily demonstrate desired characteristics and preventing unacceptable characteristics (generation of leak current in the case of the donor element (D), and elimination of the improvement of life characteristics achieved by the donor element (D) in the case of the acceptor element (A)) from manifesting.

Figure 2:
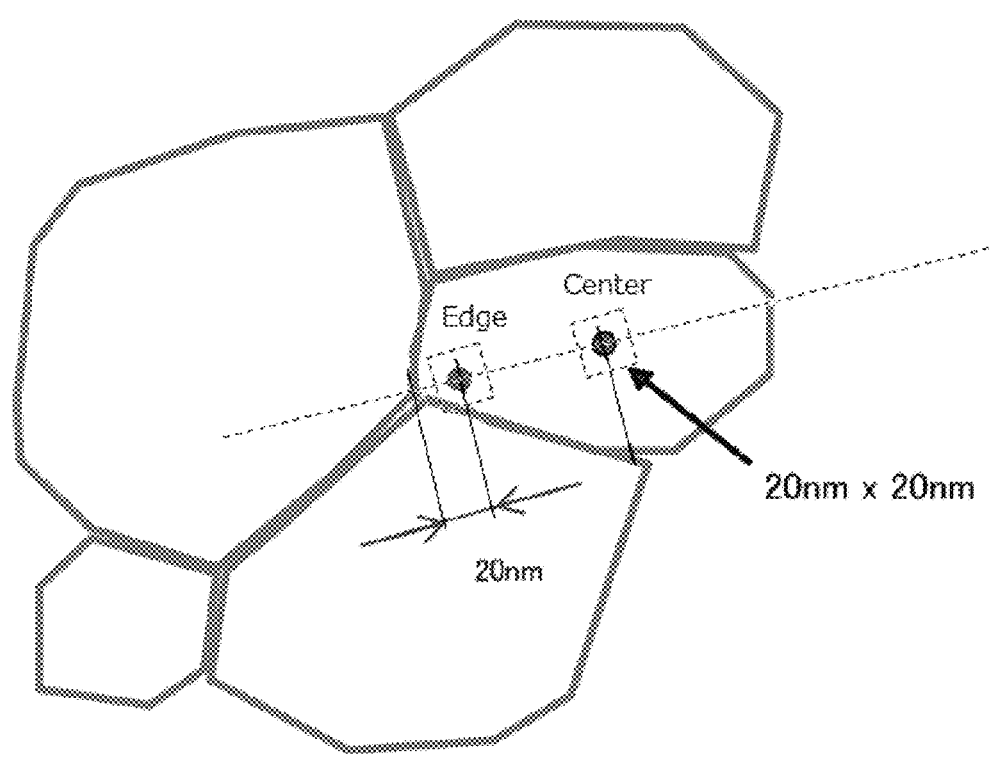
FIG. 2 is a schematic drawing showing the center part ("center") and outer edge part ("edge") of the ceramic grain where the concentration of the donor element (D) and that of the acceptor element (A) are measured.

As shown in FIG. 2, under the present invention the center part of the ceramic grain refers to the center point of the diameter along the maximum diameter when the ceramic grain is observed with a transmission electron microscope (TEM) (or its equivalent), while the outer edge part of the ceramic grain refers to the part 20 nm into the ceramic grain, along the maximum diameter, from the point of intersection between the maximum diameter and grain boundary.

Under the present invention, the concentration of the donor element (D) and that of the acceptor element (A) are measured in a 20 nm×20 nm region at the center part and outer edge part using a TEM-EDS (or its equivalent), to obtain the ratio of these concentrations D/A. As for the outer edge part, there are two points of intersection between the maximum diameter and grain boundary, which means that there are two outer edge parts per ceramic grain; under the present invention, however, it suffices to measure the concentration of the donor element (D) and that of the acceptor element (A) for either one of these outer edge parts.

It should be noted that, under the present invention, the concentration of the donor element (D) and that of the acceptor element (A), as well as the D/A ratio, are obtained at the center part and outer edge part for randomly selected 10 ceramic grains constituting the dielectric layer. And, if the averages of the center part D/A ratios and outer edge part D/A ratios obtained for the 10 ceramic grains satisfy the requirements specified under the present invention, these ceramic grains are considered to match those specified under the present invention.

As an example, Table 1 below shows the concentrations of the donor element (D) and those of the acceptor element (A), D/A ratios, and average D/A ratios, of 10 ceramic grains, as obtained in Example 1 described later.

acceptor element (A) is done by producing specified samples from the multilayer ceramic capacitor 1 and observing the ceramic grains on the samples. The production method of samples, as well as the measuring method of the concentration of the donor element (D) and acceptor element (A), will be explained in detail in examples below.

Under the present invention, it is important that the averages of the center part D/A ratios and outer edge part D/A ratios of the ceramic grains satisfy the requirements specified herein, where the 10 ceramic grains may include a grain or grains not individually satisfying the requirements of the present invention.

From the viewpoint of the life characteristics of the multilayer ceramic capacitor 1 and also from the viewpoint of suppressing its leak current, preferably five or more ceramic grains out of the 10 ceramic grains satisfy the requirements of the present invention individually, or more preferably all 10 ceramic grains satisfy the requirements of the present invention individually.

Figure 3A:
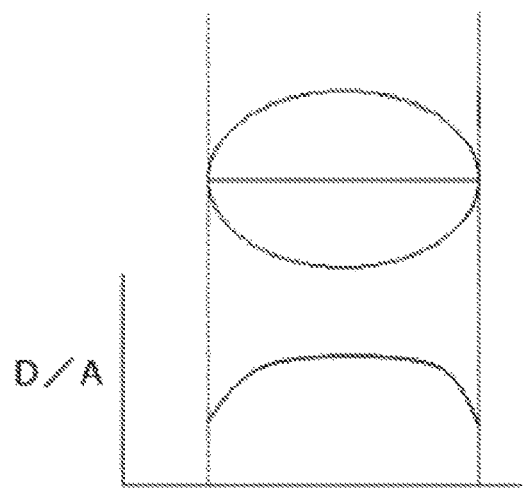
FIG. 3A is a drawing showing a condition where the D/A ratio is flat.
Figure 3B:
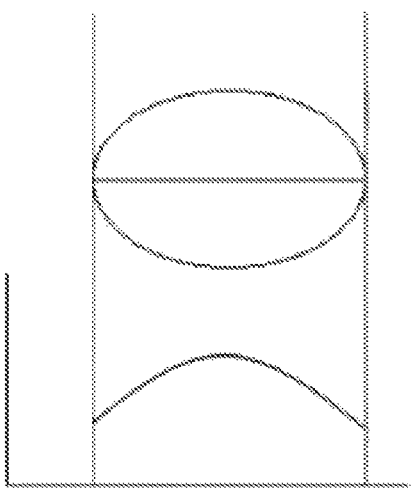
FIG. 3B is a drawing showing a condition where the D/A ratio has a slope, in the area on the inside of the outer edge part of the ceramic grain.

It should be noted that, while the present invention specifies the ratio of the concentration of the donor element (D) and that of the acceptor element (A) at the center part and outer edge part of the ceramic grain, the D/A ratio between the center part and outer edge part, or specifically on the inside of the outer edge part of the ceramic grain, may be approximately the same as that at the center part (the D/A ratio is consistently flat on the inside), as shown in FIG. 3A, or the D/A ratio may change from the center part toward the outer edge part in such a way that it gradually decreases and becomes closer to the D/A ratio at the outer edge part (the D/A ratio has a slope on the inside; the outer edge part may also have a slope with the D/A ratio decreasing as it gets closer to the grain boundary), as shown in FIG. 3B.

In addition, the concentration of the donor element (D) in the dielectric layer 12 (not the concentration of the donor element (D) in one ceramic grain, but that in the entire dielectric layer) is not limited in any way so long as the effects of the present invention are achieved; however, preferably it is 0.05 to 0.3 mol relative to 100 mol of $BaTiO_3$ in the dielectric layer 12. When this concentration is 0.05 mol or more, favorable life characteristics improvement effect is achieved by the donor element (D); when the concentration is 0.3 mol or less, on the other hand, the concentration of the donor element (D) does not become excessive and the suppression of leak current by the acceptor element (A) is facilitated. The concentration of the donor

TABLE 1

| | | Center part | | | | | Outer edge part | | | |
|---|---|---|---|---|---|---|---|---|---|---|
| Example 1 | Donor element (D) | Concentration of donor element mol % | Acceptor element (A) | Concentration of acceptor element mol % | D/A | D | Concentration of D mol % | A | Concentration of A mol % | D/A |
| 1 | Mo | 0.20 | Mg | 0.00 | ∞ | Mo | 0.20 | Mg | 0.60 | 0.3 |
| 2 | Mo | 0.20 | Mg | 0.00 | ∞ | Mo | 0.15 | Mg | 0.50 | 0.3 |
| 3 | Mo | 0.20 | Mg | 0.05 | 4.0 | Mo | 0.20 | Mg | 0.55 | 0.4 |
| 4 | Mo | 0.15 | Mg | 0.00 | ∞ | Mo | 0.20 | Mg | 0.40 | 0.5 |
| 5 | Mo | 0.20 | Mg | 0.00 | ∞ | Mo | 0.15 | Mg | 0.55 | 0.3 |
| 6 | Mo | 0.20 | Mg | 0.00 | ∞ | Mo | 0.20 | Mg | 0.45 | 0.4 |
| 7 | Mo | 0.20 | Mg | 0.00 | ∞ | Mo | 0.20 | Mg | 0.80 | 0.3 |
| 8 | Mo | 0.15 | Mg | 0.00 | ∞ | Mo | 0.15 | Mg | 0.50 | 0.3 |
| 9 | Mo | 0.20 | Mg | 0.05 | 4.0 | Mo | 0.15 | Mg | 0.85 | 0.2 |
| 10 | Mo | 0.20 | Mg | 0.00 | ∞ | Mo | 0.20 | Mg | 0.50 | 0.4 |
| Average | | 0.20 | | 0.00 | ∞ | | 0.20 | | 0.55 | 0.3 |

It should be noted that the aforementioned measurement of the concentration of the donor element (D) and that of the element (D) relative to $BaTiO_3$ in the dielectric layer 12 can be measured using the inductively coupled plasma (ICP)

measurement method. The concentration of the acceptor element (A) relative to $BaTiO_3$ can also be measured using this method.

Preferably the donor element (D) is Mo from the viewpoint of the life characteristics of the multilayer ceramic capacitor 1 and also from the viewpoint of suppressing its leak current. Under the present invention, a donor element (D) can be used alone or multiple elements can be used in any combination; however, preferably the type of the donor element (D) present at the center part of the ceramic grain is the same as that present at the outer edge part, because it facilitates the control of life characteristics.

Furthermore, the concentration of the acceptor element (A) in the dielectric layer 12 is not limited in any way so long as the effects of the present invention are achieved; however, preferably it is greater than 0.3 mol but less than 2.0 mol relative to 100 mol of $BaTiO_3$ in the dielectric layer 12. When this concentration is greater than 0.3 mol, favorable leak current suppression effect is achieved by the acceptor element (A); when the concentration is less than 2.0 mol, on the other hand, the concentration of the acceptor element (A) does not become excessive and the life characteristics can be improved favorably by the donor element (D). Under the present invention, an acceptor element (D) can be used alone or multiple elements can be used in any combination.

Under the present invention, the acceptor element (A) is rich at the outer edge part of the ceramic grain and demonstrates the effect of trapping the electrons supplied by the donor element (D), thereby suppressing leak current, as mentioned above. Furthermore, the acceptor element (A) also demonstrates the effect of adding reduction resistance to $BaTiO_3$, thereby increasing the insulation resistance of the multilayer ceramic capacitor.

The multilayer ceramic capacitor 1 according to the present invention is such that its dielectric layer 12 contains new ceramic grains whose ratio of the concentration of the donor element (D) and that of the acceptor element (A) has a specified distribution in the ceramic grain, as explained above.

While the average grain size of these ceramic grains is not limited in any way, preferably it is 80 to 800 nm from the viewpoint of the thickness reduction of the dielectric layer 12. It should be noted that, in this Specification, the average grain size can be defined as the average of Feret diameters measured on all grains observed in randomly selected multiple photographs showing at least 300 grains in total, taken with a scanning electron microscope (SEM) or TEM by observing the ceramic grains and then adjusting the magnifications so that approximately 80 grains would be seen in one image. The Feret diameter refers to the directed tangential diameter defined by the distance between two parallel tangential lines sandwiching a grain.

[Method for Manufacturing Multilayer Ceramic Capacitor]

The method for manufacturing the multilayer ceramic capacitor according to the present invention as explained above, is explained below.

First, a material powder for forming the dielectric layer is prepared. The dielectric layer normally contains ceramic grains whose primary component is $BaTiO_3$, in the form of sintered compact.

$BaTiO_3$ is a tetragonal compound having a perovskite structure and exhibits a high dielectric constant. In general, this $BaTiO_3$ can be synthesized by causing titanium dioxide or other titanium material to react with barium carbonate or other barium material. Preferably the specific surface area of the titanium material is in a range of 10 to 300 $m^2/g$ from the viewpoint of synthesizing fine $BaTiO_3$, while preferably the specific surface area of the barium material is in a range of 10 to 50 $m^2/g$ from the viewpoint of synthesizing fine $BaTiO_3$.

Various methods have been heretofore known for synthesizing $BaTiO_3$, such as the solid phase method, sol-gel method, and hydrothermal method, for example. Under the present invention, any of these methods can be adopted.

It should be noted that, under the present invention, a compound (such as oxide) containing the donor element (D) is mixed into the titanium material and barium material to cause $BaTiO_3$ synthetic reaction, and thereby produce $BaTiO_3$ grains beforehand in which the donor element (D) is present as solid solution in a roughly uniform manner, in order to make the ratio of the concentration of the donor element (D) and that of the acceptor element (A), or D/A, greater than 1 at the center part of the ceramic grain in the dielectric layer. In the synthesis of $BaTiO_3$ grains, tentative baking may be implemented at a temperature of approx. 800 to 1000° C. If so desired, in the synthesis of $BaTiO_3$, a compound containing the acceptor element (A) may also be added to the extent that the D/A ratio is greater than 1 at the center part of the ceramic grain.

By adding a compound (such as oxide) containing the acceptor element (A) to the obtained ceramic powder and then sintering it through a normal process for manufacturing multilayer ceramic capacitors to grow the grain, while causing the $BaTiO_3$ grain to take in the acceptor element (A), the ceramic grain proposed by the present invention is produced which has a distribution of being donor element (D) rich at the center part of the ceramic grain and acceptor element (A) rich at the outer edge part.

Specified additive compounds may be added to the ceramic powder according to the purposes. The additive compounds include oxides of rare earth elements (Y, Dy, Tm, Ho, and Er) as well as oxides of Y, Sm, Eu, Gd, Tb, Er, Tm, Cr, V, Co, Ni, Li, B, Na, K, and Si. These additive compounds are wet-mixed with the ceramic powder and then the mixture is dried and pulverized. Furthermore, a compound containing the donor element (D) may also be added to the ceramic powder, if so desired, to the extent that the D/A ratio is less than 1 at the outer edge part of the ceramic grain.

In addition, the average grain size of the $BaTiO_3$ grains obtained by the method explained above for use in the manufacture of the multilayer ceramic capacitor proposed by the present invention, is preferably 50 to 150 nm from the viewpoint of reducing the thickness of the dielectric layer. The measuring method of the average grain size is similar to the aforementioned measuring method of the average grain size of the ceramic grains in the dielectric layer.

The ceramic powder obtained as above may be pulverized, for example, to adjust the grain sizes or a classification process may be combined to equalize the grain sizes, as necessary.

Then, polyvinyl butyral (PVB) resin or other binder, ethanol, toluene, or other organic solvent, and dioctyl phthalate (DOP) or other plasticizer are added to and wet-mixed with the ceramic powder. The obtained slurry is coated onto a base material, etc., using the die-coater method or doctor blade method, for example, in the form of a band-shaped dielectric green sheet of 1.2 μm or less in thickness, and then dried. Thereafter, a metal conductive paste containing organic binder is printed onto the surface of the dielectric green sheet by means of screen printing or gravure printing, to dispose internal electrode layer patterns that are led out alternately to a pair of external electrodes of different polarities. For this metal, nickel is widely adopted from the viewpoint of cost. It should be noted that barium titanate with an average grain size of 50 nm or less may be uniformly dispersed in the metal conductive paste as a co-material.

After that, the dielectric green sheets on which the internal electrode layer patterns have been printed are stamped out to specified sizes, and after their base materials are peeled, the stamped-out dielectric green sheets are laminated to a specified number of layers (such as 5 to 500 layers) in such a way that the internal electrode layers 13 alternate with the dielectric layers 12, and also that the internal electrode layers are led out alternately to the pair of external electrodes of different polarities, with their edges exposed alternately at both end faces of the dielectric layer in the length direction. Cover sheets that will become cover layers 15 are pressure-bonded to the top and bottom of the laminated dielectric green sheets, after which the laminate is cut to specified chip dimensions (such as 1.0 mm×0.5 mm) and then a Ni conductive paste that will become external electrodes 20 is applied onto both side faces of the cut laminate and dried. This way, a molding of multilayer ceramic capacitor 1 is obtained. The external electrodes may be formed on both end faces of the laminate by means of thick film deposition using the sputtering method.

The molding of multilayer ceramic capacitor thus obtained is exposed to a $N_2$ ambience of 250 to 500° C. to remove the binder, and then sintered in a reducing ambience at 1100 to 1300° C. for 10 minutes to 2 hours to sinter the compounds constituting the dielectric green sheet and thereby grow the grains. This way, a multilayer ceramic capacitor 1 is obtained which has a laminate 11 that internally contains, as a sintered compact, the sintered dielectric layers 12 laminated alternately with the internal electrode layers 13, as well as the cover layers 15 formed as outermost layers in the laminating direction.

Under the present invention, re-oxidization treatment may be implemented at 600 to 1000° C.

There is another embodiment relating to the method for manufacturing multilayer ceramic capacitor, where the external electrodes and dielectrics may be sintered in different processes. For example, a laminate constituted by laminated dielectric layers may be sintered and then a conductive paste may be baked onto both ends of it to form external electrodes.

EXAMPLES

The present invention is explained in greater detail below using examples. It should be noted, however, that the present invention is not at all limited to these examples.

Example 1

<Production of Multilayer Ceramic Capacitor>

Mo was used as the donor element (D). Hexaammonium heptamolybdate tetrahydrate was dissolved in ion exchange water and, after adding a dispersant, the resulting aqueous solution was made into a slurry with $BaCO_3$ (30 m$^2$/g) and $TiO_2$ (50 m$^2$/g) added to a Ba/Ti mol ratio of 0.999, and then the slurry was mixed and dispersed using a bead mill. For this slurry, 0.20 mol of Mo was added in equivalent $MoO_3$ quantity per 100 mol of the $BaTiO_3$. The slurry was dried to remove the water, and then tentatively baked at 900° C., to synthesize a Mo-containing $BaTiO_3$ with an average grain size of 80 nm as obtained from SEM photographs.

Next, Mg was used as the acceptor element (A), additives $Ho_2O_3$, MgO, and $SiO_2$ were added at the ratios of 0.5 mol, 0.5 mol, and 1.0 mol, respectively, relative to 100 mol of the aforementioned Mo-containing $BaTiO_3$, and then $BaCO_3$ was also added to achieve a Ba/Ti mol ratio of 1.000, after which solvent was added to produce a slurry. PVB binder was added to this slurry and the slurry was coated on PET films to a thickness of 1.0 μm to produce green sheets.

Next, a Ni conductive paste was printed on the green sheets as internal electrodes, and these printed sheets were used to produce a 10-layer multilayer ceramic capacitor of the 1005 shape. After removing the binder, the capacitor was sintered in a reducing ambience at 1250° C., and oxidized again in a $N_2$ ambience at 800° C. The thickness of the sintered dielectric layer was 0.8 μm.

<Measurement of Various Characteristics, Etc.>

The quantity of Mo (total quantity of the donor element (D)) contained in the dielectric layer of the obtained multilayer ceramic capacitor was measured with ICP and confirmed to be 0.20 mol in equivalent $MoO_3$ per 100 mol of $BaTiO_3$. Similarly the quantity of Mg (total quantity of the acceptor element (A)) was confirmed to be 0.50 mol in equivalent MgO.

Next, the concentration of the donor element (D) and that of the acceptor element (A) were measured at each site of the dielectric ceramic grain using a TEM-EDS (TEM Model JEM-2100F manufactured by JEOL, EDS Detector Model JED-2300T manufactured by JOEL). The samples for observation were produced by machine-polishing re-oxidized multilayer ceramic capacitors (polishing the surface perpendicular to the internal electrode layers) and then reducing their thickness to 0.05 μm by ion milling. The region for EDS measurement corresponding to the dielectric layer part sandwiched by the Ni internal electrodes, and two locations at the center part and outer edge part of the ceramic grain, each consisting of a 20 nm×20 nm area, were measured, as shown in FIG. 2.

The Mo concentration was obtained from the MoKα peak area near 17.5 keV. The Mo concentration was determined by producing $BaTiO_3$ sintered compacts beforehand by varying the additive Mo quantity from 0.05 mol to 0.50 mol, and utilizing the calibration curve created from the relationship of the concentration obtained by ICP and the MoKα peak area detected by the TEM-EDS. The concentrations of Mg and other elements were also determined in a similar manner using the calibration curve method.

The concentration of the donor element (D) and that of the acceptor element (A) were measured for 10 ceramic grains randomly selected from the dielectric layer. Table 2 below shows, for each of the 10 ceramic grains, the concentration of the donor element (D) and that of the acceptor element (A), as well as the D/A ratio, at the center part and outer edge part of the grain. Ten out of the 10 grains satisfied the D/A relationships specified under the present invention. It should be noted that the D/A average was rounded to the second decimal place (the same applies to the Examples and Comparative Examples below).

TABLE 2

| | | Center part | | | | Outer edge part | | | |
| --- | --- | --- | --- | --- | --- | --- | --- | --- | --- |
| Example 1 | Donor element (D) | Concentration of donor element mol % | Acceptor element (A) | Concentration of acceptor element mol % | D/A | D | Concentration of D mol % | A | Concentration of A mol % | D/A |
| 1 | Mo | 0.20 | Mg | 0.00 | ∞ | Mo | 0.20 | Mg | 0.60 | 0.3 |
| 2 | Mo | 0.20 | Mg | 0.00 | ∞ | Mo | 0.15 | Mg | 0.50 | 0.3 |
| 3 | Mo | 0.20 | Mg | 0.05 | 4.0 | Mo | 0.20 | Mg | 0.55 | 0.4 |

TABLE 2-continued

| Example 1 | Donor element (D) | Center part Concentration of donor element mol % | Acceptor element (A) | Concentration of acceptor element mol % | D/A | Outer edge part D | Concentration of D mol % | A | Concentration of A mol % | D/A |
|---|---|---|---|---|---|---|---|---|---|---|
| 4 | Mo | 0.15 | Mg | 0.00 | ∞ | Mo | 0.20 | Mg | 0.40 | 0.5 |
| 5 | Mo | 0.20 | Mg | 0.00 | ∞ | Mo | 0.15 | Mg | 0.55 | 0.3 |
| 6 | Mo | 0.20 | Mg | 0.00 | ∞ | Mo | 0.20 | Mg | 0.45 | 0.4 |
| 7 | Mo | 0.20 | Mg | 0.00 | ∞ | Mo | 0.20 | Mg | 0.80 | 0.3 |
| 8 | Mo | 0.15 | Mg | 0.00 | ∞ | Mo | 0.15 | Mg | 0.50 | 0.3 |
| 9 | Mo | 0.20 | Mg | 0.05 | 4.0 | Mo | 0.15 | Mg | 0.85 | 0.2 |
| 10 | Mo | 0.20 | Mg | 0.00 | ∞ | Mo | 0.20 | Mg | 0.50 | 0.4 |
| Average | | 0.20 | | 0.00 | ∞ | | 0.20 | | 0.55 | 0.3 |

In consideration of the margin of error of the calibration curve, the TEM-EDS measured results were rounded below the minimum unit of element concentration of 0.05 percent by mol (the same applies to the Examples and Comparative Examples below).

When the concentration distribution was defined based on this minimum unit, the average concentrations at the center part and outer edge part of the ceramic grain of the samples were the same at 0.20 percent by mol. It is presumed that, by mixing the Mo compound, $BaCO_3$, and $TiO_2$, and causing them to react together beforehand, the Mo concentration became uniform at the center part and outer edge part of the dielectric ceramic grain.

On the other hand, scarcely any Mg was found at the center part of the grain, which means that it was localized at the edge part of $BaTiO_3$. In this case, the concentration of such localized Mg at the outer edge part should be higher than the concentration of the blended Mg (concentration of the total quantity of Mg); in reality, however, it was equivalent to the concentration of the blended Mg. This is probably because Mg not present in the form of solid solution in the ceramic grain is left at the grain boundary.

The average grain size of ceramic grains, as obtained by TEM observation, was 150 nm.
<Evaluation of Multilayer Ceramic Capacitor>
(Life Test)
Next, lifespans of the produced multilayer ceramic capacitors were determined using the method described below. For each of 100 multilayer ceramic capacitors, the resistivity was monitored over time at 150° C. and in a direct-current field of 20 V/μm. A drop in resistivity by two digits or more was defined as failure and the time until occurrence of the first failed product was measured, and the life test was conducted for a maximum of 400 hours.

For those samples that failed before 400 hours, the time-to-failure was recorded. In this test, the acceptance condition was set to a time-to-first-failed-product of 200 hours or longer. Preferably this time is 300 hours or longer.

When the samples in Example 1 were evaluated using this method, all passed because none of them failed before 400 hours.
(Leak Current Test)
The leak current from the produced multilayer ceramic capacitor was measured using the method described below. Electrical current of 10 V/μm was applied at 150° C. to each of 10 multilayer ceramic capacitors and the value of electrical current was measured after 60 seconds, and by defining this value as leak current, the acceptance condition was set to a maximum leak current of 100 nA or less among the 10 ceramic capacitors. Preferably this value is 50 nA or less.

When the samples in Example 1 were evaluated using this method, the maximum value of leak current was 30 nA, which met the acceptance condition. It should be noted that the minimum unit of the value of electrical current was 10 nA and any smaller value was rounded. The same applies to the Examples and Comparative Examples below.

Examples 2 to 22 and Comparative Examples 1 to 8

Various characteristics, etc., of the multilayer ceramic capacitor were measured and the multilayer ceramic capacitor was evaluated in the same manner as in Example 1 by producing a multilayer ceramic capacitor in the same manner as in Example 1, except that the blending quantities of the donor element (D) and acceptor element (A) were changed as shown in Table 3 below. The results are shown in Table 3 below, together with the results of the capacitor in Example 1. It should be noted that the D/A values shown in Table 3 are each an average of 10 ceramic grains. Also, those values not satisfying the requirements specified under the present invention are underlined. Additionally, "400 h" under life test indicates that there was no failed product at the elapse of 400 hours.

TABLE 3

| Example No. | Thickness of dielectric layer um | Total blended quantity Total quantity of donor element mol % (per $BaTiO_2$) | Total quantity of acceptor element mol % (per $BaTiO_2$) | Center part Donor element | Acceptor element | D/A | Outer edge part Donor element | Acceptor element | D/A | D/A Ratio of applicable grain (per 10) | (160° C. 20 V/um) Time to first failure in life test h (MAX400h) | Leak current nA (160° C. 10 V/um) |
|---|---|---|---|---|---|---|---|---|---|---|---|---|
| Example 1 | 0.8 | 0.20 | 0.50 | Mo | — | ∞ | Mo | Mg | 0.3 | 10 | 400 | 30 |
| Comparative Example | 0.8 | 0.00 | 0.75 | — | — | 0 | — | Mg | 0.0 | 0 | 40 | Less than 10 |

TABLE 3-continued

| Example No. | Thickness of dielectric layer um | Total blended quantity Total quantity of donor element mol % (per BaTiO₂) | Total blended quantity Total quantity of acceptor element mol % (per BaTiO₂) | Center part Donor element | Center part Acceptor element | Center part D/A | Outer edge part Donor element | Outer edge part Acceptor element | Outer edge part D/A | D/A Ratio of applicable grain (per 10) | (160° C. 20 V/um) Time to first failure in life test h (MAX400h) | Leak current nA (160° C. 10 V/um) |
|---|---|---|---|---|---|---|---|---|---|---|---|---|
| Comparative Example | 0.8 | 0.20 | 0.65 | Mo | Mg | 0.7 | Mo | Mg | 0.3 | 0 | 110 | 20 |
| Comparative Example | 0.8 | 0.05 | 0.40 | Mo | Mn | 1.0 | Mo | Mn | 0.1 | 1 | 160 | 10 |
| Example 2 | 0.8 | 0.20 | 0.55 | Mo | Mg | 2.0 | Mo | Mg | 0.4 | 9 | 400 | 30 |
| Example 3 | 0.8 | 0.20 | 0.50 | Mo | Mg + Mn | 4.0 | Mo | Mn | 0.4 | 8 | 380 | 30 |
| Example 4 | 0.8 | 0.10 | 0.35 | Mo | Mn | 2.0 | Mo | Mn | 0.3 | 8 | 400 | 20 |
| Comparative Example | 0.8 | 0.15 | 0.05 | Mo | Mn | 3.0 | Mo | — | ∞ | 0 | 400 | 500 |
| Comparative Example | 0.8 | 0.20 | 0.15 | Mo | Mg | 4.0 | Mo | Mg | 4.0 | 4 | 320 | 370 |
| Comparative Example | 0.8 | 0.20 | 0.30 | Mo | Mn | 2.0 | Mo | Mn | 1.0 | 3 | 270 | 120 |
| Example 5 | 0.8 | 0.20 | 0.80 | Mo | Mn | 2.0 | Mo | Mg + Mn | 0.3 | 10 | 400 | 30 |
| Example 6 | 0.8 | 0.15 | 0.55 | Mo | Mg + Mn | 1.5 | Mo | Mg + Mn | 0.3 | 9 | 330 | 30 |
| Example 7 | 0.8 | 0.33 | 0.80 | Mo | Mn | 3.5 | Mo | Mn | 0.7 | 8 | 400 | 80 |
| Example 8 | 0.8 | 0.40 | 0.70 | Mo | Mg | 4.0 | Mo | Mg + Mn | 0.6 | 5 | 400 | 100 |
| Example 9 | 0.8 | 0.25 | 1.05 | Mo | Mg | 2.0 | Mo + Ta | Mg + Mn | 0.3 | 9 | 330 | 40 |
| Example 10 | 0.8 | 0.25 | 1.80 | Mo | Mg | 5.0 | Mo + W | Mg + Mn | 0.1 | 7 | 370 | 20 |
| Example 11 | 0.8 | 0.25 | 2.00 | Mo | Mg | 3.0 | Mo | Mg + Mn | 0.2 | 5 | 240 | 40 |
| Example 12 | 0.8 | 0.35 | 1.05 | Mo | Mn | 2.0 | Mo + Nb | Mg + Mn | 0.1 | 8 | 350 | 10 |
| Example 13 | 0.8 | 0.20 | 0.65 | Mo | Mg | 2.0 | Mg | Mg + Mn | 0.3 | 4 | 210 | 30 |
| Example 14 | 0.8 | 0.20 | 0.60 | Nb | Mg | 2.0 | Nb | Mg | 0.4 | 0 | 400 | 20 |
| Example 15 | 0.8 | 0.20 | 0.55 | Ta | Mg | 2.0 | Ta | Mg + Mn | 0.3 | 10 | 400 | 30 |
| Example 16 | 0.8 | 0.20 | 0.55 | W | Mg | 2.0 | W | Mg | 0.5 | 9 | 400 | 20 |
| Example 17 | 0.8 | 0.15 | 0.45 | Nb + Mo | Mg | 1.5 | Nb + Mo | Mg + Mn | 0.5 | 8 | 400 | 30 |
| Example 18 | 0.8 | 0.15 | 0.50 | Nb + Ta | Mg | 1.5 | Nb + Ta | Mg | 0.2 | 10 | 370 | 40 |
| Example 19 | 0.8 | 0.20 | 0.60 | Ta + W | Mg | 2.0 | Ta + W | Mg | 0.3 | 10 | 400 | 20 |
| Example 20 | 0.8 | 0.20 | 0.75 | Nb + Mo + Ta + W | Mg + Mn | 2.0 | Nb + Mo + Ta + W | Mg | 0.3 | 9 | 400 | 40 |
| Example 21 | 0.5 | 0.20 | 0.30 | Mo | — | ∞ | Mo | Mg | 0.5 | 9 | 400 | 20 |
| Example 22 | 0.5 | 0.15 | 0.90 | Nb + Mo + Ta + W | Mg + Mn | 1.5 | Nb + Mo + Ta + W | Mg | 0.2 | 8 | 400 | 30 |
| Comparative Example | 0.5 | 0.20 | 0.85 | Mo | Mg | 0.7 | Mo | Mg | 0.2 | 8 | 20 | 20 |
| Comparative Example | 0.5 | 0.25 | 0.05 | Mo | Mn | 8.0 | Mo | Mn | 5.0 | 4 | 400 | 400 |

Table 3 reveals the following.

In Comparative Example 1 using ceramic grains of pure $BaTiO_3$ having no donor element (D) or acceptor element (A) at the center part, many oxygen defects occurred because there was no donor element (D) in the ceramic grain, and consequently the lifespan became short.

In Comparative Example 2, which was acceptor element (A) rich (D/A<1) at the center part although the donor element (D) was present, the entire grain became acceptor rich as a result and the excessive acceptor led to excessive oxygen defects, and consequently the lifespan became short.

In Comparative Example 3 whose D/A ratio at the center part was 1, the effect of adding the donor element (D) was neutralized by the acceptor element (A) and no oxygen defect suppression effect was achieved by the donor element (D), and consequently the lifespan became short.

From Example 1 and Comparative Examples 1 to 3 above, it was found that the D/A ratio at the center part must be greater than 1 for the life characteristics to improve.

In Example 2, one of the 10 ceramic grains was out of the D/A ranges specified under the present invention. However, the D/A averages of the 10 ceramic grains were within the ranges specified under the present invention, and therefore the lifespan was excellent and leak current was suppressed. This result suggests that the effects of the present invention are achieved so long as the ratio of the grains matching the aforementioned ranges is sufficiently high and the averages also satisfy the aforementioned ranges, even when not all of the ceramic grains are within the ranges specified under the present invention.

From Examples 3 and 4, it was found that the effects of the present invention are achieved whether Mg and Mn are used in combination, or Mn is used alone, as the acceptor element (A).

In Comparative Example 4, where the acceptor element (A) Mn was added together with the donor element (D) Mo when $BaTiO_3$ was synthesized, the concentration of the acceptor (A) at the outer edge part became zero (detected concentration was less than 0.05 percent by mol) and the donor element (D) generated excessive electrons and this led to excessive leak current.

In Comparative Example 5, which was donor element (D) rich at the outer edge part although the acceptor element (A)

was present, the donor element (D) generated excessive electrons and this led to excessive leak current. It should be noted that, although four of the 10 ceramic grains from Comparative Example 5 satisfied the D/A ranges specified under the present invention, the averages of the 10 grains did not satisfy these ranges. This result suggests that the effects are not necessarily achieved when there is at least one grain satisfying the ranges specified under the present invention, and that the averages must satisfy these ranges.

In Comparative Example 6 whose D/A ratio at the outer edge part was 1, the electrons supplied by the donor element (D) could not be fully trapped by the acceptor element (A) and large leak current generated as a result.

From Comparative Examples 4 to 6 and Examples 1 to 4 above, it was found that the D/A ratio at the outer edge part must be less than 1 for the leak current to be suppressed.

From Examples 5 to 22, it was found that the effects of the present invention are achieved even when more than one donor element (D) and/or acceptor element (A) are used in combination, even when the concentration of the total quantity of the donor element (D) and that of the acceptor element (A) in the dielectric layer exceed the preferred ranges under the present invention as explained above, even when the type of the donor element (D) present at the center part of the ceramic grain is different from that present at the outer edge part, even when Nb, Ta, or W is used as the donor element (D), and even when the thickness of the dielectric layer is set to 0.5 μm.

Also, from Examples 7, 8, and 12, it was found that preferably the concentration of the total quantity of the donor element (D) in the dielectric layer is lower than a certain value from the viewpoint of suppressing leak current, and from Example 11, preferably the concentration of the total quantity of the acceptor element (A) in the dielectric layer is lower than a certain value from the viewpoint of life characteristics.

Furthermore in Example 13, the D/A averages of the 10 ceramic grains satisfied the ranges specified under the present invention, but as few as four grains satisfied these ranges. Probably for this reason, the life characteristics were among the lower of all the examples.

In Comparative Example 7 whose ceramic grain composition was similar to that of Comparative Example 2, the thickness of the dielectric layer was 0.5 μm but the life characteristics were unacceptable.

In Comparative Example 8 whose ceramic grain composition was similar to that of Comparative Example 5, the thickness of the dielectric layer was 0.5 μm but the leak current was unacceptable.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2015-014179, filed Jan. 28, 2015, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor having a laminate comprising dielectric layers stacked alternately with internal electrode layers of different polarities, wherein:
   the dielectric layers contain ceramic grains whose primary component is $BaTiO_3$;
   the ceramic grains contain at least one donor element (D) selected from the group consisting of Nb, Mo, Ta, and W, and at least one acceptor element (A) selected from the group consisting of Mg and Mn; and
   a ratio of a concentration of the donor element (D) and that of the acceptor element (A) (D/A) is greater than 1 at center parts of the ceramic grains, while the D/A ratio is less than 1 at outer edge parts of the ceramic grains (if A=0, then D/A=∞ and D=A=0 never occurs).

2. A multilayer ceramic capacitor according to claim 1, wherein the concentration of the donor element (D) in the dielectric layers is 0.05 to 0.3 mol relative to 100 mol of $BaTiO_3$.

3. A multilayer ceramic capacitor according to claim 1, wherein the concentration of the acceptor element (A) in the dielectric layers is greater than 0.3 mol but less than 2.0 mol relative to 100 mol of $BaTiO_3$.

4. A multilayer ceramic capacitor according to claim 2, wherein the concentration of the acceptor element (A) in the dielectric layers is greater than 0.3 mol but less than 2.0 mol relative to 100 mol of $BaTiO_3$.

5. A ceramic capacitor according to claim 1, wherein the donor element (D) present at the center parts of the ceramic grains is the same element as that present at the outer edge parts.

6. A ceramic capacitor according to claim 2, wherein the donor element (D) present at the center parts of the ceramic grains is the same element as that present at the outer edge parts.

7. A ceramic capacitor according to claim 3, wherein the donor element (D) present at the center parts of the ceramic grains is the same element as that present at the outer edge parts.

8. A ceramic capacitor according to claim 4, wherein the donor element (D) present at the center parts of the ceramic grains is the same element as that present at the outer edge parts.

9. A ceramic capacitor according to claim 1, wherein an average grain size of the ceramic grains is 80 to 800 nm.

10. A ceramic capacitor according to claim 2, wherein an average grain size of the ceramic grains is 80 to 800 nm.

11. A ceramic capacitor according to claim 3, wherein an average grain size of the ceramic grains is 80 to 800 nm.

12. A ceramic capacitor according to claim 4, wherein an average grain size of the ceramic grains is 80 to 800 nm.

13. A ceramic capacitor according to claim 5, wherein an average grain size of the ceramic grains is 80 to 800 nm.

14. A ceramic capacitor according to claim 6, wherein an average grain size of the ceramic grains is 80 to 800 nm.

15. A ceramic capacitor according to claim 7, wherein an average grain size of the ceramic grains is 80 to 800 nm.

16. A ceramic capacitor according to claim 8, wherein an average grain size of the ceramic grains is 80 to 800 nm.

* * * * *